United States Patent
Gope et al.

(10) Patent No.: US 11,908,238 B2
(45) Date of Patent: Feb. 20, 2024

(54) METHODS AND SYSTEMS FOR FACIAL POINT-OF-RECOGNITION (POR) PROVISIONING

(71) Applicant: Nortek Security & Control, Carlsbad, CA (US)

(72) Inventors: Chandan Gope, Derwood, MD (US); Gagan Gupta, Delhi (IN); Nitin Jindal, Faridabad (IN); Krishna Khadloya, San Jose, CA (US); Vaidhi Nathan, San Jose, CA (US)

(73) Assignee: NORTEK SECURITY & CONTROL, Carlsbad, CA (US)

( * ) Notice: Subject to any disclaimer, the term of this patent is extended or adjusted under 35 U.S.C. 154(b) by 80 days.

(21) Appl. No.: 17/176,896

(22) Filed: Feb. 16, 2021

(65) Prior Publication Data
US 2021/0224519 A1 Jul. 22, 2021

Related U.S. Application Data (63) Continuation-in-part of application No. 16/364,886, filed on Mar. 26, 2019, now Pat. No. 10,943,095, and a continuation of application No. 16/216,907, filed on Dec. 11, 2018, now abandoned, said application No. 16/364,886 is a continuation of application No. 15/265,094, filed on Sep. 14, 2016, now Pat. No.
(Continued)

(51) Int. Cl.
| | |
|---|---|
| G06K 9/62 | (2022.01) |
| G06V 40/16 | (2022.01) |
| G06T 7/246 | (2017.01) |
| G06V 10/50 | (2022.01) |
| G06V 10/46 | (2022.01) |

(52) U.S. Cl.
CPC ............ *G06V 40/171* (2022.01); *G06T 7/246* (2017.01); *G06V 10/50* (2022.01); *G06V 40/161* (2022.01); *G06V 40/172* (2022.01); *G06T 2207/10016* (2013.01); *G06T 2207/10024* (2013.01); *G06T 2207/20072* (2013.01); *G06T 2207/20084* (2013.01); *G06T 2207/30201* (2013.01); *G06V 10/467* (2022.01)

(58) Field of Classification Search
CPC .. G06V 40/16–40/179; G06V 40/172–40/173; G06V 40/168–40/171
See application file for complete search history.

(56) References Cited

U.S. PATENT DOCUMENTS

| | | | |
|---|---|---|---|
| 10,311,288 B1 * | 6/2019 | Dandekar | G06F 16/5838 |
| 2014/0026157 A1 * | 1/2014 | Wang | H04N 21/44218 725/12 |
| 2018/0276454 A1 * | 9/2018 | Han | G06V 10/454 |

* cited by examiner

*Primary Examiner* — Brian Werner
(74) *Attorney, Agent, or Firm* — Mohamed Azeez (57) ABSTRACT

Disclosed is a facial recognition system/method, utilizing modules to perform the following routine: extracting a feature descriptor from a detected feature point of a detected face in an input image frame; and matching the extracted feature descriptor with at least one of a pre-stored facial image that is index-mapped, comprising at least a first and second round of matching, wherein the second round of matching only selects the index-mapped facial images that matched above a pre-defined threshold from the first round of matching. Optionally, the above described steps may be coupled to a Point-of-Recognition (POR) provisioning, enabling an on-demand gate-keeping and/or payment processing for an end-user at an event/venue entry or point-of-sale.

18 Claims, 7 Drawing Sheets

Related U.S. Application Data

10,275,641, said application No. 16/216,907 is a continuation of application No. 15/179,966, filed on Jun. 10, 2016, now Pat. No. 10,163,684.

(60) Provisional application No. 62/235,587, filed on Oct. 1, 2015, provisional application No. 62/235,578, filed on Oct. 1, 2015.

FIG. 5 matching flow extracting a feature descriptor from a detected feature point of a detected face in an input image frame

602 matching the extracted feature descriptor with at least one of a pre-stored facial image that is index-mapped, comprising at least a first and second round of matching, wherein the second round of matching only selects the index-mapped facial images that matched above a pre-defined threshold from the first round of matching.

METHODS AND SYSTEMS FOR FACIAL POINT-OF-RECOGNITION (POR) PROVISIONING

TECHNICAL FIELD

The present invention generally relates to the field of face recognition, and in particular, the disclosure relates to methods and systems for double matching of extracted feature descriptors of an image for enabling a Point-of-Recognition (POR) provisioning.

BACKGROUND

With the development of the information society, the importance of identifying individuals has rapidly grown. In order to permit access to a secure electronic system, biometric authentication verifies the identity of a user based on the unique biological characteristics of the user. Examples of the unique biological characteristics include, but are not limited to, fingerprints, hand geometry, earlobe geometry, retina and iris patterns, voice waves, keystroke dynamics, DNA, facial features and signatures.

Face recognition uses a non-contact method to identify users based on their facial features and is thus, deemed more convenient and competitive as compared to the other biometric authentication methods.

Some of the areas where face recognition may be used are safety, security and surveillance, access control, smart home, augmented reality and image-based search engines. However, there are many factors that may affect the performance of a face recognition system. Examples of the factors include, but are not limited to, gender, age, race, facial expressions, face direction, size of the face, facial hair, jewelry, illumination conditions and environmental factors. Therefore, there is a need to develop systems for face recognition that are robust against these factors.

Additionally, there is a need for robust face recognition that is time-efficient and on-demand in order to support on-site provisioning, whether it be serving as a facial-recognition mediated "gate-keeping" function or a payment transaction. In order to support these end-user provisioning, a facial recognition pipeline needs to be lag-avoidant and iterative. A system and method is required to fulfill these twin goals enabling a point-of-recognition provisioning (POR).

Although, there are various products and applications available in the market for face recognition, the existing solutions have issues related to accuracy and scalability. Therefore, there is a need for efficient and accurate ways for recognizing faces in images.

SUMMARY

An embodiment of the invention discloses a feature extraction system for extracting feature descriptors for an image. The feature extraction system comprises of a processor, a non-transitory storage element coupled to the processor and encoded instructions stored in the non-transitory storage element. The encoded instructions when implemented by the processor, configure the feature extraction system to extract features of the image. The feature extraction system further comprises of a filtering unit, a mapping unit, a region selection unit, and a feature description unit. The filtering unit is configured to generate a set of Gabor Magnitude Images (GMIs) for the image using multi-orientation (p) and multi-scale (q) Gabor filters. The set of GMIs comprises of $p*q$ GMIs. The values for each of the p and q are selected based on at least one of an inter class feature distance and intra class feature distance computed for a set of training images. The mapping unit is configured to generate a set of Local Gabor Binary Pattern (LGBP) maps by computing local binary patterns for each GMI of the set of GMIs using one or more local binary codes. The one or more local binary codes are quantized into one or more levels. The set of LGBP maps comprises $p*q$ LGBP maps. The region selection unit is configured to select a plurality of regions in the image. A region of the plurality of regions is determined by a feature point of a set of feature points detected in the image. The feature description unit configured to generate $p*q$ histograms for each region of the plurality of regions. A histogram of the $p*q$ histograms is generated for an LGBP map of the $p*q$ LGBP maps. Whereby, histograms thus generated for the plurality of regions are the feature descriptors for the image.

Another embodiment of the invention discloses a feature extraction system for extracting feature descriptors an image. The image comprises of a face. The feature extraction system comprises of a processor, a non-transitory storage element coupled to the processor and encoded instructions stored in the non-transitory storage element. The encoded instructions when implemented by the processor, configure the feature extraction system to extract the features of the image. The feature extraction system further comprises a filtering unit, a mapping unit, a region selection unit, and a feature description unit. The filter is configured to generate a set of Gabor Magnitude Images (GMIs) for the image using multi-orientation (p) and multi-scale (q) Gabor filters. The set of GMIs comprises of $p*q$ GMIs. The values for each of the p and q are selected based on at least one of an inter class feature distance and intra class feature distance computed for a set of training images. The mapping unit configured to generate a set of Local Gabor Binary Pattern (LGBP) maps by computing local binary patterns for each GMI of the set of GMIs using one or more local binary codes. The one or more local binary codes are quantized into one or more levels, and the set of LGBP maps comprises $p*q$ LGBP maps. The region selection unit is configured to select a plurality of regions in the image. A region of the plurality of regions is determined by a facial feature point of a set of facial feature points detected in the image. The feature description unit is configured to generate $p*q$ histograms for each region of the plurality of regions. A histogram of the $p*q$ histograms is generated for a LGBP map of the $p*q$ LGBP maps. Histograms thus generated for the plurality of regions are the feature descriptors for the image.

Yet another embodiment of the invention describes a method for extracting feature descriptors for an image, the method comprising generating a set of Gabor Magnitude Images (GMIs) for the image using multi-orientation (p) and multi-scale (q) Gabor filters, wherein the set of GMIs comprises of $p*q$ GMIs, and wherein values for each of the p and q are selected based on at least one of an inter class feature distance and intra class feature distance computed for a set of training images; generating a set of Local Gabor Binary Pattern (LGBP) maps by computing local binary patterns for each GMI of the set of GMIs using one or more local binary codes, wherein the one or more local binary codes are quantized into one or more levels, and wherein the set of LGBP maps comprises $p*q$ LGBP maps; selecting a plurality of regions in the image, wherein a region of the plurality of regions is determined by a feature point of a set of feature points detected in the image; and generating $p*q$ histograms for each region of the plurality of regions, wherein a histogram of the p*q histograms is generated for a LGBP map of the p*q LGBP maps. Histograms thus generated for the plurality of regions are the feature descriptors for the image.

Yet another aspect of the invention describes systems and methods for a Point-of-Recognition (POR) provisioning by describing a threshold-grade double matching of extracted feature descriptors routine. In one embodiment, described is A facial recognition method/system, said method/system utilizing distinct system modules to perform the steps of: extracting a feature descriptor from a detected feature point of a detected face in an input image frame; and matching the extracted feature descriptor with at least one of a pre-stored facial image that is index-mapped, comprising at least a first and second round of matching, wherein the second round of matching only selects the index-mapped facial images that matched above a pre-defined threshold from the first round of matching. In other embodiments, the double matching of index-mapped facial images based on a threshold-grade matching achieves the on-demand and verifiable matching essential for end-user Point-of-Recognition (POR) provisioning—enabling on-site gate-keeping or payment transactions.

DETAILED DESCRIPTION OF DRAWINGS

The present invention will now be described more fully with reference to the accompanying drawings, in which embodiments of the invention are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.
Overview The primary purpose of the disclosure is to enable devices/machines/systems to extract feature descriptors for an image. Typically, the image comprises a face. In this case, the extracted features are used for face recognition.

The present disclosure focuses on extracting feature descriptors for the image by generating a set of Local Gabor Binary Pattern (LGBP) maps on at least one of an intensity map, individual color channels and a transformed color space of the image. However, for a person skilled in the art it understood these examples are just for understanding purposes and the disclosure can be implemented for objects other than faces.

Exemplary Environment

Figure 1:
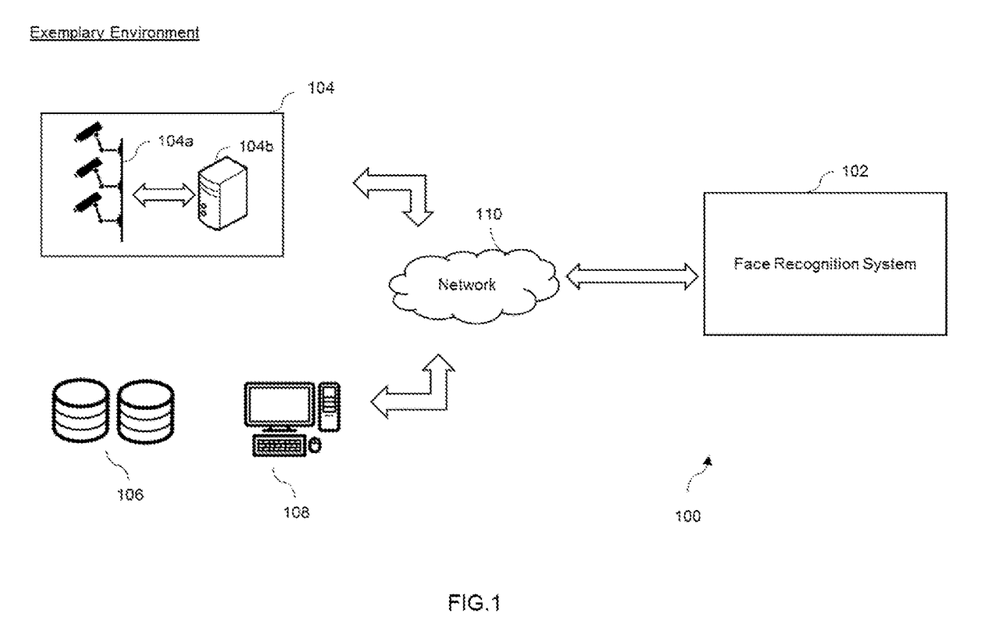
FIG. 1 illustrates an exemplary environment in which various embodiments of the disclosure can be practiced.

FIG. 1 illustrates an exemplary environment 100 in which various embodiments of the present invention can be practiced. The environment 100 includes a Face Recognition System 102, a real-time streaming system 104, a video/image archive 106, and a computer system 108. The real-time streaming system 104 includes a video server 104a, and a plurality of video/image capturing devices 104b installed across multiple locations. Examples of the locations include, but are not limited to, roads, parking spaces, garages, toll booths, outside residential areas, outside office spaces, outside public places (such as malls, recreational areas, museums, libraries, hospitals, police stations, fire stations, schools, colleges), and the like. The video/image capturing devices 104b include, but are not limited to, Closed-Circuit Television (CCTVs) cameras, High Definition (HD) cameras, non-HD cameras, handheld cameras, or any other video/image grabbing units. The video server 104a of the real-time streaming system 104 receives a dynamic imagery or video footage from the video/image capturing devices 104b, and transmits the associated data to the face recognition system 102. The video/image archive 106 is a data storage that is configured to store pre-recorded or archived videos/images. The video/image archive 106 may be composed of a plurality of local databases or remote databases. Also, the databases may be centralized and/or distributed. In an alternate scenario, the video/image archive 106 may store data using a cloud based scheme. Similar to the real-time streaming system 104, the video/image archive 106 transmits data to the face recognition system 102. The computer system 108 is any computing device remotely located from the face recognition 102, and stores a plurality of videos/images in its local memory. In an embodiment, the computer system 108 can be replaced by one or more of a computing server, a mobile device, a memory unit, and a handheld device. The real-time streaming system 104, the video/image archive 106, the computer system 108 and the face recognition system 102 are connected over a network 110. In an embodiment of the present invention, the real-time streaming system 104 and/or the computer system 108 may also send data (images/frames of a video) to the video/image archive 106 for storage and subsequent retrieval.

The network 110 may be any suitable wired network, wireless network, a combination of these or any other conventional network, without limiting the scope of the present invention. Few examples may include a LAN or wireless LAN connection, an Internet connection, a point-to-point connection, or other network connection and combinations thereof. The network 110 may be any other type of network that is capable of transmitting or receiving data to/from host computers, personal devices, telephones, video/image capturing devices, video/image servers, or any other electronic devices. Further, the network 110 is capable of transmitting/sending data between the mentioned devices. Additionally, the network 110 may be a local, regional, or global communication network, for example, an enterprise telecommunication network, the Internet, a global mobile communication network, or any combination of similar networks. The network 110 may be a combination of an enterprise network (or the Internet) and a cellular network, in which case, suitable systems and methods are employed to seamlessly communicate between the two networks. In such cases, a mobile switching gateway may be utilized to communicate with a computer network gateway to pass data between the two networks. The network 110 may include any software, hardware, or computer applications that can provide a medium to exchange signals or data in any of the formats known in the art, related art, or developed later.

The face recognition system 102 is part of at least one of a surveillance system, a security system, a traffic monitoring system, a home security system, an access control system and a toll fee system. The face recognition system 102 is configured to receive data from the real-time streaming system 104, the video/image archive 106, and/or the computing system 108. The data can be in form of one or more video streams and/or one or more images. In case of the one or more video streams, the face recognition system 102 converts each video into a sequence of frames. Broadly, the face recognition system 102 processes the one or more received images (or frames of videos) and executes a face recognition technique. Face recognition involves receiving an image/frame, detecting one or more faces in the image, detecting feature points for each of the detected faces in the image, aligning and normalizing the detected feature points, extracting feature descriptors based on the detected feature points and matching the extracted feature descriptors with a set of pre-stored images for face recognition. More details will be discussed with reference to FIG. 2.

Face Recognition System 102

Figure 2:
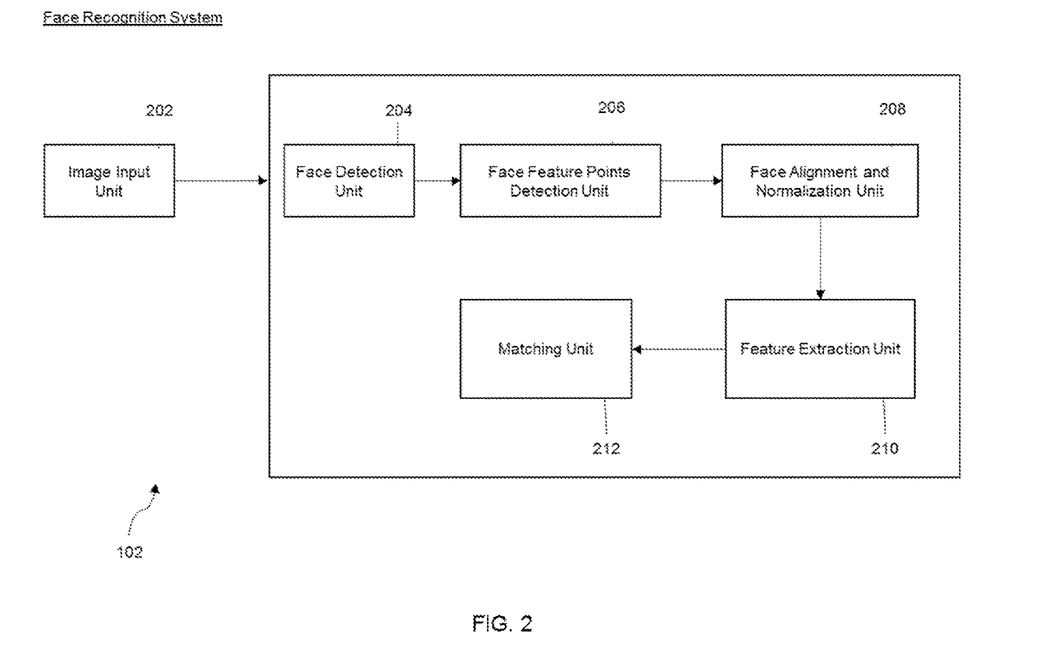
FIG. 2 illustrates a face recognition system, according to an embodiment of the disclosure.

FIG. 2 illustrates various components of the face recognition system 102. The face recognition system 102 includes an image input unit 202, a face detection unit 204, a face feature points detection unit 206, a face alignment and normalization unit 208, a feature extraction unit 210 and a matching unit 212.

Image Input Unit 202

The image input unit 202 is configured to receive data from at least one of the real-time streaming system 104, the video/image archive 106, and the computer system 108. The data primarily comprises of at least one image/frame captured in real-time by the video/image capturing devices 104b. In an embodiment of the invention, the data corresponds to at least one image/frame previously stored in the video/image archive 106 or the computer system 108.

The image/frame received by the image input unit 202 may be in at least one format of the group comprising PDF, PCD, PSD, EPS, JPEG, JPG, JIF, JFIF, TIF, TIFF GIF, BMP, PNG, MOV, OGG, WMV, FLV, MP4, MPEG, AVI, QT and ARF. Further, the image/frame may be of any size, color, or length (in case the frame is a part of a video).

The image input unit 202 sends the received data (image/frame) to the face detection unit 204 for further processing.

Face Detection Unit 204

The face detection unit 204 is configured to detect one or more faces in the image/frame. The face detection unit 204 may use at least one method of the group comprising deep neutral net, Haar transformation, Local Binary Pattern (LBP) and Histograms of Oriented Gradients (HoG) with Adaboost to detect the one or more faces.

In an embodiment of the invention, the data received by the face detection unit 204 includes a video i.e. a sequence of frames. In this case, the face detection unit 204 detects one or more faces in a frame of the video and tracks each face of the one or more faces across the subsequent frames until the face disappears. The quality of appearances of the face across the frames is determined based on at least one of sharpness, size, noise, motion blur and pose variations. Based on this, the best appearances of the face are selected for further processing by the face recognition system 102.

Face Feature Points Detection Unit 206

The face feature points detection unit 206 is configured to detect a set of feature points in a face of the one or more faces detected by the face detection unit 204. Examples of the feature points include, but are not limited to eyes, nose, lips, eyebrows, mouth, lips, ears and the like.

In an embodiment of the invention, the face feature point detection unit 206 uses at least one of an active appearance model and an active shape model for detecting the one of more feature points. These models use histogram of oriented gradients (HOG) descriptors to detect the feature points. In another embodiment, a multivariate regression technique is used to match descriptors around a landmark.

In an embodiment of the invention, the initial positions of feature points/parts of the face such as eyes, nose and lips are estimated using a constrained deformable part-based model (CDPBM). This model uses HoGs as part-based filters and is trained by latent Support Vector Machines (SVM) where the location and geometry of the parts form the latent variables. The detected face is rescaled to a fixed size and processed at single scale. Based on the latent variables, a location corresponding to the highest score is determined for each of the parts of the face. Next, feature points are detected for each of the parts using the active shape model.

Face Alignment and Normalization Unit 208

The face alignment and normalization unit 208 is configured to align and normalize the feature points detected for the face. The feature points are mapped to a pre-defined 3D face model. This provides a mapping for the face from 2D to 3D. Once the feature points are mapped, this 3D face model is back projected to obtain an aligned 2D face. This helps in aligning the in plane rotated faces and also out of the plane rotations to some extent.

The aligned 2D face is then normalized for illumination variation, local shadows and highlights. The normalization may be performed on at least one of the intensity scale of the face, individual color channels of the face and a transformed color space of the face.

According to an embodiment, the face alignment and normalization unit 206 is further configured to normalize the face using at least one of:

1. Gamma correction: To enhance local dynamic range of the face in dark or shadowed regions, while compressing local dynamic range in bright regions and at highlights;
2. Difference of Gaussian (DoG) Filtering: To reduce the influence of overall intensity gradients, shading effects and noise in the face.
3. Masking: To reduce distracting influence of elements such as glasses, and hair on the forehead and ears.
   In an embodiment, upper and lower edges of glasses are detected and then, special filters are applied to remove the effect of glasses on the face. This improves feature quality in the area around eyes leading to improved accuracy. This is particularly useful in matching the face of a person wearing glasses with an image of the same person without glasses. In addition to that, hair is detected on the face and weightages corresponding to the areas with hair are reduced.
4. Contrast equalization: To standardize a robust measure of overall contrast or intensity variation for the face by global and local rescaling of intensities.

Feature Extraction Unit 210

The feature extraction unit 210 is configured to extract feature descriptors for the face aligned and normalized by the face alignment and normalization unit 208. The feature descriptors are extracted based on Local Gabor Binary Pattern (LGBP) maps generated for the face. Multi-orientation and multi-scale Gabor filters (p orientation and q scales) are used to convolve the face and generate magnitudes of these convolutions as Gabor Magnitude Images (GMIs). Next, Local binary patterns (LBP) are computed for each of these p*q GMIs, turning them into p*q LGBP maps. Further details regarding the feature extraction unit 210 will be discussed in FIG. 3.

In an embodiment, the feature extraction unit 212 is further configured to transform the feature descriptors to a lower dimensional space using a discriminant analysis approach such as Fisher Discriminant Analysis, Principle Component Analysis and Independent Component Analysis (ICA).

Matching Unit 212

The matching unit 212 is configured to match the feature descriptors generated for the face with one or more pre-stored images for face recognition. Specifically, the matching unit 212 is configured to match the feature descriptors with one of more signatures of the pre-stored images.

Figure 3:
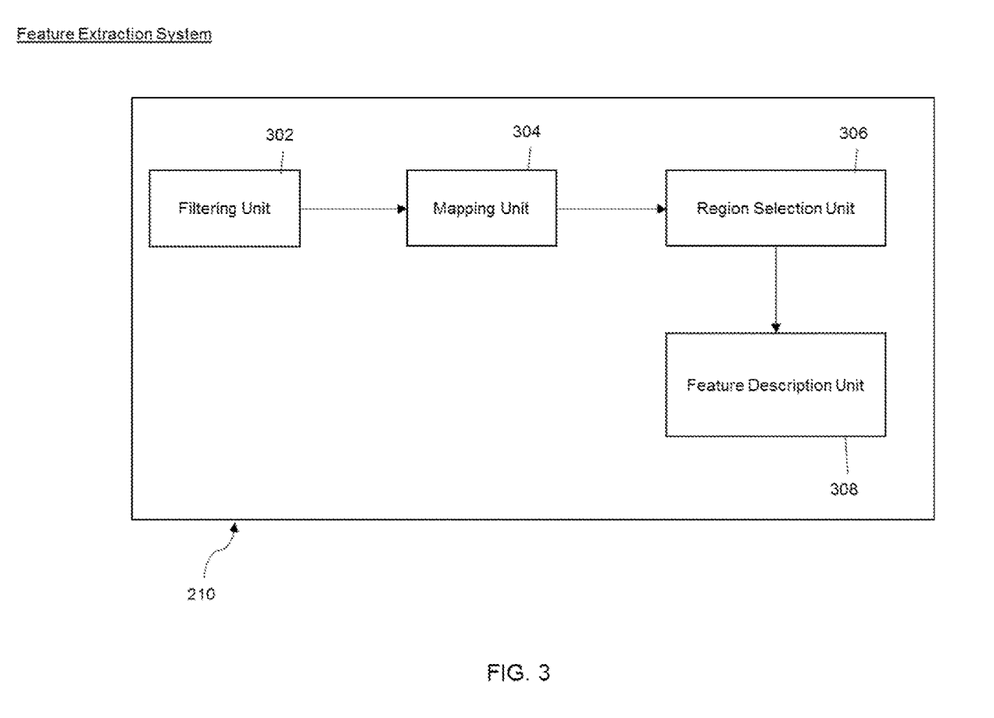
FIG. 3 illustrates a feature extraction system, according to an embodiment of the disclosure.

FIG. 3 illustrates various components of the feature extraction unit 210. Going forward, the feature extraction unit 210 is referred to as a feature extraction system 210. The feature extraction system 210 is configured to extract feature descriptors for an image. Typically, the image is a face with feature points aligned and normalized by the face alignment and normalization unit 208. Feature extraction may be based on at least one of the group comprising an intensity map of the image, an individual colour channel of the image and a transformed color space of the image.

As illustrated, the feature extraction system 210 includes a filtering unit 302, a mapping unit 304, a region selection unit 306, and a feature description unit 308. Each of the shown components communicate with each other using conventional protocols such as the bus protocol. The components 302-308 shown here are exemplary and are for understanding purposes, but for a person skilled in the art, it is understood that the feature extraction system 210 may have one or more additional components for performing the required functions of feature extraction. While in other embodiments, the components may be combined/integrated to perform the required functions of feature extraction. While describing the drawings, references to other figures/elements may be made.

In an embodiment, the components 302-308 may be in the form of hardware components, while in another embodiment, the components 302-308 may be in the form of software entities/modules. In yet another embodiment, the components may be a combination of hardware and software modules.

The feature extraction system 210 may be a part of at least one of the group comprising a mobile phone, a computer, a server or a combination thereof.

Filtering Unit 302

The filtering unit 302 is configured to generate a set of Gabor Magnitude Images (GMIs) for the image using multi-orientation (p) and multi-scale (q) Gabor filters. The set of GMIs, thus generated, comprises of p*q GMIs. Values corresponding to the number of orientations (p) and the number of scales (q) are selected based on at least one of an inter class feature distance and intra class feature distance computed for a set of training images. The selection of orientations and scales for the Gabor filters is optimized for high discriminative ability. These scales, orientations and the resulting Gabor filters are configured to achieve high accuracy.

In an embodiment, a two-step analytical and verification approach is followed for selecting the values for p and q. To begin with, GMIs and Local Gabor Binary Patterns (LGBP) are computed for a large set of scales and orientations. For each scale and orientation, inter class and intra class feature distances are calculated over the set of training images. Based on statistical analysis of the inter class and intra class feature distances, features most discriminative across classes and invariant in a class are identified. Thereby, best M orientations and best N scales are selected from these features as Set 1. Next, multiple sets of 8 orientations and 5 scales are selected from Set 1 to check accuracy across the set of training images. Set with highest accuracy is selected as Set 2 to be used in Gabor filters. Typically, values for orientations may be in the range of 5-15, whereas values for scales may be in the range of 3-12.

Mapping Unit 304

The mapping unit 304 is configured to generate a set of Local Gabor Binary Pattern (LGBP) maps by computing local binary patterns (LBPs) for each GMI of the set of GMIs using one or more local binary codes. In an embodiment, the one or more local binary codes are quantized into one or more levels. The set of LGBP maps comprises of p*q LGBP maps. It has been observed that the LGBP maps are more discriminative than other features like Histogram of Gradients (HoG) of LBP.

Region Selection Unit 306

The region selection unit 206 is configured to select a plurality of regions in the image. A region is represented by an area of pre-determined size centered on a feature point, as detected by the face feature detection unit 206.

Feature Description Unit 308

The feature description unit 308 is configured to generate p*q histograms for each region of the plurality of regions. Each histogram generated for a region corresponds to a LGBP map of the p*q LGBP maps.

Histograms thus generated for the plurality of regions selected in the image are the feature descriptors for the image. According to an embodiment of the present disclosure, the feature extraction system 200 further configured to transform the histograms to a lower dimensional subspace using a post processor 212.

Taking an example, the image is a face comprising M regions selected based on the feature points detected in the face. The size of each of the M regions is W×H pixels. For a region of size W×H pixels (for example, around a left eye), histograms are computed on each of the p*q LGBP maps. This means, for the image corresponding to M regions, p*q*M histograms are generated as feature descriptors. These histograms are concatenated to form a histogram sequence (LGBPHS), as the final feature representation.

It should be appreciated that the feature extraction system 210 may also extract other feature descriptors for the image. Examples of the other feature descriptors include, but are not limited to, Local Binary Patterns (LBPs), three patch local binary patterns (TPLBP), histogram of gradients (HOG) and learning based descriptors.

In an embodiment, the feature extraction system 210 is configured to handle scenarios with at least one of the group comprising low resolution, occlusion, glare, rotation, different user identities, ages, races, facial expressions and different illumination conditions.

In an embodiment, the feature extraction system 210 further includes a new feature point generation unit and a post processor. The new feature point generation unit is configured to generate one or more new feature points based on at least one of the set of feature points detected by the feature point detection unit 204.

The post processor is configured to transform the feature descriptors to a lower dimensional space using a discriminant analysis approach such as Fisher Discriminant Analysis, Principle Component Analysis and Independent Component Analysis (ICA).

Exemplary Flowchart—Feature Extraction

Figure 4:
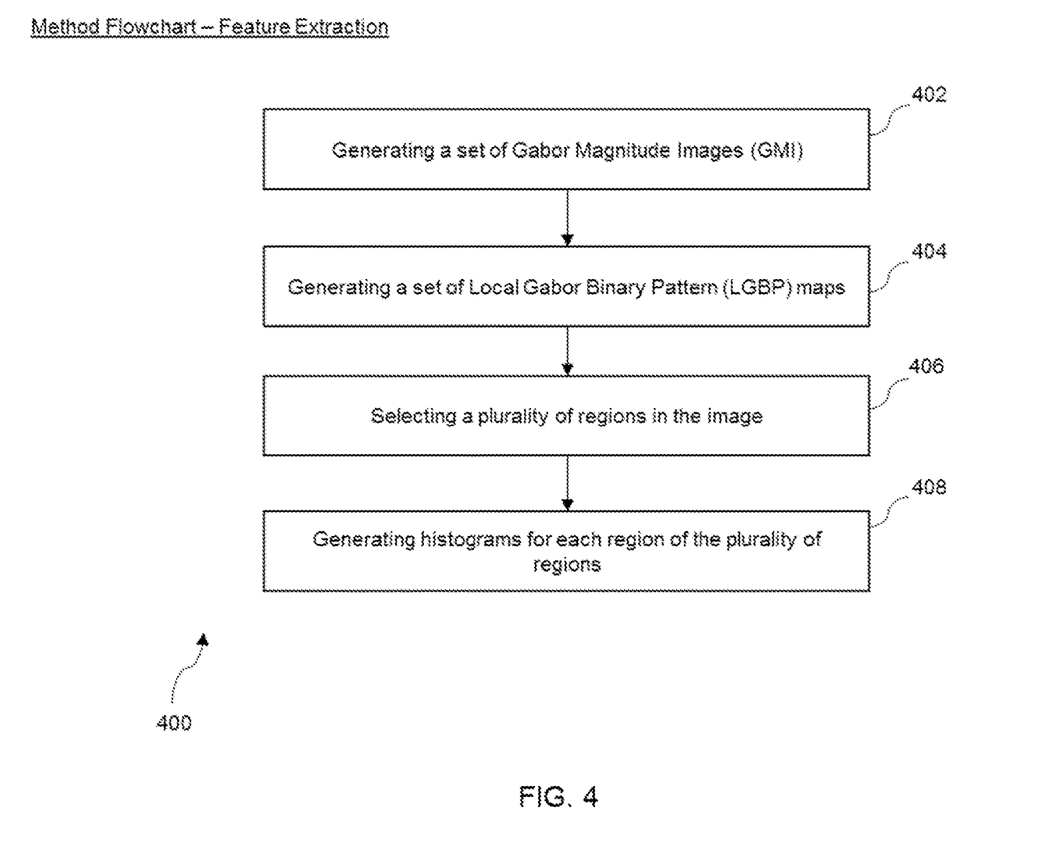
FIG. 4 is a method flowchart for extracting feature descriptors for an image, according to an embodiment of the disclosure.

FIG. 4 is a method flowchart 400 for extracting feature descriptors of an image according to an embodiment of the present disclosure. Typically, the image is a face with feature points aligned and normalized by the face alignment and normalization unit 208. Feature extraction may be based on at least one of the group comprising an intensity map of the image, an individual color channel of the image and a transformed color space of the image.

At step 402, a set of Gabor Magnitude Images (GMIs) are generated for the image using multi-orientation (p) and multi-scale (q) Gabor filters. The set of GMIs, thus generated, comprises of p*q GMIs. Values corresponding to the number of orientations (p) and the number of scales (q) are selected based on at least one of an inter class feature distance and intra class feature distance computed for a set of training images. At step 404, set of Local Gabor Binary Pattern (LGBP) maps is generated by computing local binary patterns (LBPs) for each GMI of the set of GMIs using one or more local binary codes. In an embodiment, the one or more local binary codes are quantized into one or more levels. The set of LGBP maps comprises of p*q LGBP maps. At step 406, a plurality of regions is selected in the image. A region is represented by an area of pre-determined size centered on a feature point, as detected by the face feature detection unit 206.

Next, at step 408, p*q histograms for each region of the plurality of regions id generated. Each histogram generated for a region corresponds to a LGBP map of the p*q LGBP maps.

Histograms thus generated for the plurality of regions selected in the image are the feature descriptors for the image.

Figure 5:
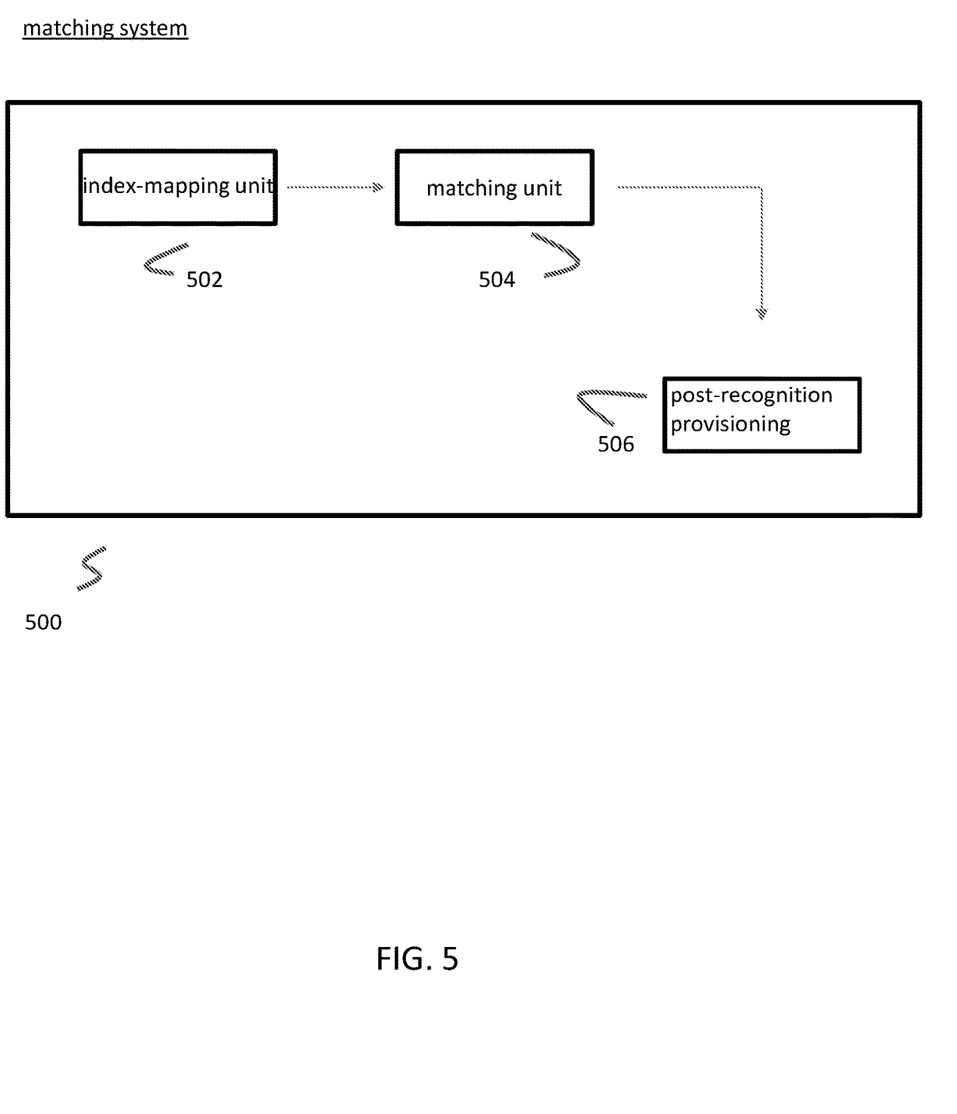
FIG. 5 is a system diagram of the matching system of the facial recognition pipeline in accordance with an aspect of the invention.

FIG. 5 illustrates a matching system 500 of the facial recognition pipeline in accordance with an aspect of the invention. Shown is an index mapping unit 502, in communication with a matching unit 504, which is in further communication with a post-recognition provisioning module 506—all enabling a more rigorous (iterative and threshold-graded) matching of extracted feature descriptors against index-mapped training (pre-stored) facial images. This more rigorous matching approach enables the low-latent, robust, and verifiable facial recognition demanded by a Point-of-Recognition (POR) provisioning (gate-keeping/payment transactions).

While not shown, a feature detection unit may receive the input facial mage from the image input unit or facial image capture means (optionally, at the POR). On receiving the input facial image, the feature detection unit may detect one or more feature points. Feature points of an image help distinguish the image from other images. Examples of the feature points include, but are not limited to, nose, brow, eyes, mouth/lips, jaw-structure, head, etc. The one or more feature points in the input image as detected by the feature detection unit are robust to variations in illumination and viewpoint changes such as rotation, translation, scaling, sheer and perspective distortions. In an embodiment of the present presentation, the feature detection unit may apply at least one algorithm of the group comprising FAST, GLOH, SIFT, SURF, BRISK and ORB to the input image for detecting the one or more feature point.

While also not shown, the feature description unit may receive the one or more feature points detected by the feature detection unit and may be configured to compute a description for each feature point of the one or more feature points. The description of the feature point is a mathematical description to encode the appearance and visual information of the feature point. Likewise, the description should be robust to illumination and viewpoint variations, efficient to compute, and small in size for efficient indexing and matching. Similarly, feature descriptions are computed for all the feature points detected in the input image of the object. The combination of all the feature descriptions corresponding to the one or more feature points detected in the input image is referred to as the signature of the input image.

Also not shown, a data storage may be configured to store a set of training images (pre-stored images) that are used for facial recognition. Along with these training images, the data storage may be configured to store related information such as feature descriptors of the training images i.e., training feature descriptors and additional information for the training images. For example, when a training image includes a face, the additional information includes gender, race, age, measurements, etc.

Figure 6:
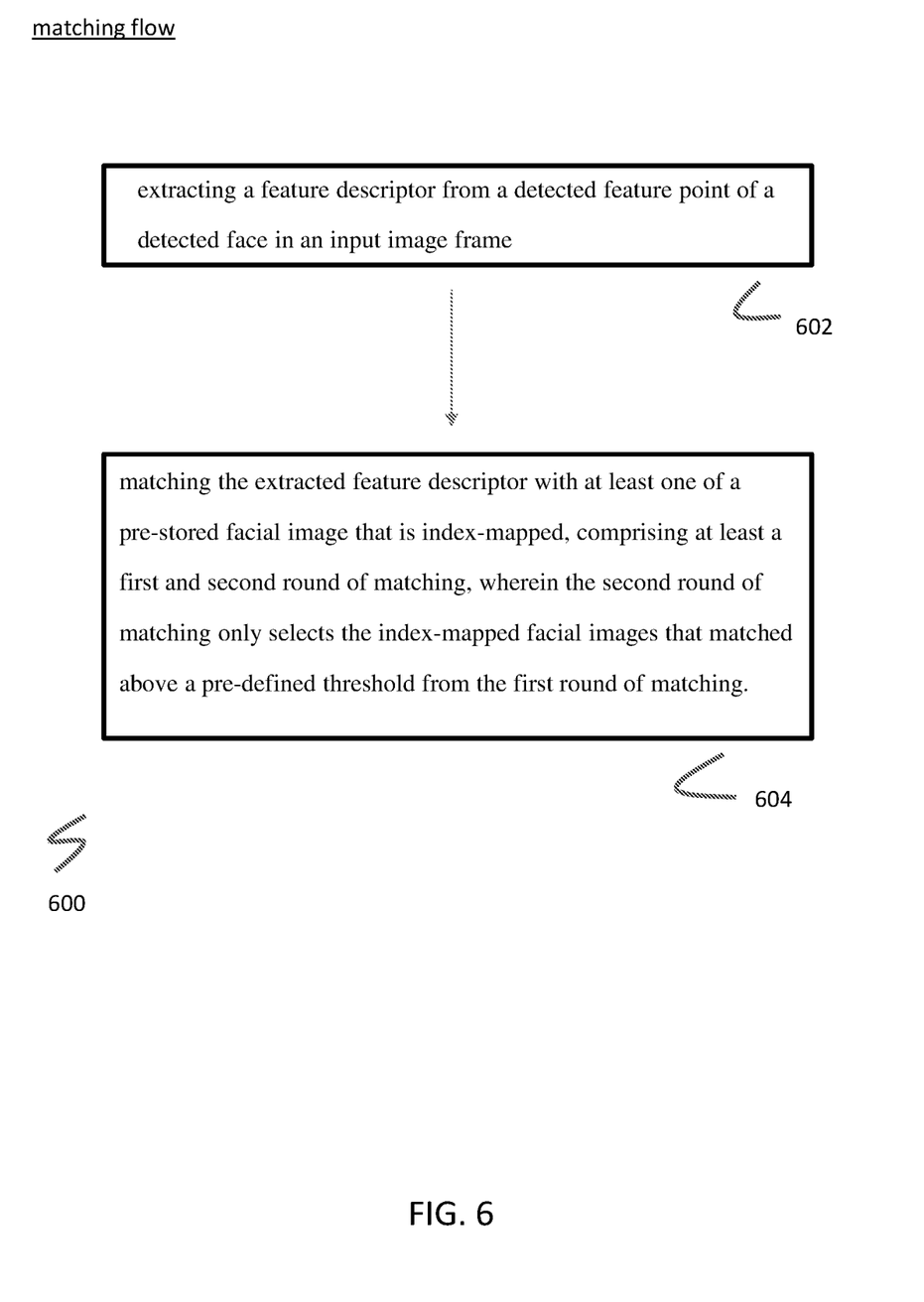
FIG. 6 is a method flow chart of the matching routine performed by the facial recognition pipeline in accordance with an aspect of the invention.

The number of training feature descriptors may be extremely large for millions of training images, therefore, there is a need to limit the number of training feature descriptors. One way to limit the number of the training feature descriptors is to use vector quantization techniques such as bag-of-words technique. To match the input image with the set of training images in the data storage, a closest match for each feature description of the input image is identified against the training feature descriptors. An exhaustive matching with each training feature descriptor may take a long time and the system may not be scalable. Hence, instead of finding the closest match, the present invention focuses on approximating the match by searching for an approximately closest match. This is performed using index mapping techniques and these will be discussed below, while referencing FIG. 6, a method flow chart of the matching routine performed by the matching system/facial recognition pipeline. FIG. 6 details a method of facial recognition comprising the steps of: extracting a feature descriptor from a detected feature point of a detected face in an input image frame 602; and matching the extracted feature descriptor with at least one of a pre-stored facial image that is index-mapped, comprising at least a first and second round of matching, wherein the second round of matching only selects the index-mapped facial images that matched above a pre-defined threshold from the first round of matching 604. The user identity verified by way of the more robust matching technique may be coupled to an on-site provisioning system (gate-keeping/payment transaction).

In continuing reference back to FIG. 5, the index mapping unit 502 creates an index mapping in order to speed up identifying a matching image among the set of training images for the input image. The index mapping unit 502 creates the index mapping based on the training feature descriptors. The index mapping is created in at least one format of an array, a hash table, a lookup table and a k-dimensional (k-d) tree. In one example, k-d tree is created based on the training feature descriptors and a selected dimension along which the split may be made at a given node in the k-d tree. In an embodiment of the present invention, a dimension with maximum variance is selected as the dimension along which the split is made in the k-d tree. In another embodiment of the present invention, the dimension is selected based on its relevance such as the ordering of feature detection. This k-d tree is then used to identify nearest neighbors with respect to the signature of the input image. Multiple such trees may be created to improve the accuracy of nearest neighbor identification. To make the data storage scalable, the present invention describes improvements that are applied to index mapping using the k-d tree. The k-d tree is pruned such that each leaf may have up to P training feature descriptors. In an example, the value of P is 16. Pruning reduces the size of the k-d tree by several times. In this manner, the present invention facilitates fitting a k-d tree of 1 billion training feature descriptions in a memory of size 12 GB.

Also shown, is a matching unit 504—acting as a search engine—configured to process the signature of the input image received from the end-user or from the computing device. In particular, the matching unit 504 performs matching of the input image with the set of training images stored in the data storage. The matching unit 504 performs the matching in two stages—a) sparse matching and b) dense matching; these will be discussed below in detail. Splitting the matching into two stages facilitates fast matching against millions of training images as stored in the data storage.

Once the signature of the input image is computed by the feature description unit, the matching unit 504 may perform the first stage of matching called sparse matching. Given the feature descriptions of the input image, the matching unit 504 identifies a set of matching training feature descriptors based on the index mapping. Training images with counts for matching training feature descriptors higher than a first pre-defined threshold are considered as candidate matches. These candidate matches are called as sparse matches. The top K sparse matches (with the highest counts for matching training feature descriptors) are selected for dense matching.

The matching unit 504 is configured to perform dense matching that uses a scoring mechanism to find the best match for the input image. The feature descriptions of the input image are densely matched using spatial consistency with each of the sparse matches to compute a matching score. In an embodiment of the present invention, the matching unit 504 is configured to compare the signature of the input image with the training feature descriptors of a sparse match to compute a one-to-one feature mapping. The feature mapping along with location of feature points in the sparse match is used to compute a transformation T between the input image and the sparse match. Feature points of the sparse match that are outliers in the transformation T are discarded. The count of feature points in the sparse match that are inliers in the transformation T are used as the matching score for the sparse match with respect to the input image. Similarly, matching scores are calculated for all sparse matches identified during sparse matching. Sparse matches having matching scores higher than a second pre-defined threshold are considered dense matches. A dense match with the highest matching score is the matching image/best match for the input image.

The matching system 500/facial recognition pipeline is configured to perform temporal verification when the input image is a frame in a video. In an embodiment of the present invention, the system is configured to analyze matching images for F continuous frames in the video to check if the matching images are consistent over time. After one or more matching images for the input image are identified by the matching unit 504, the matching unit sends the one or more matching images to the computing device, server, network, etc.

If the number of such similar looking training images is high in the data store, the matching image (identified using dense matching) may be a similar looking image and not an exact match to the input image. To resolve this, the matching system 500/facial recognition pipeline is configured to cluster similar looking training images in Similar Image Clusters (SICs). If a dense match is a part of an SIC, all images in that SIC are considered as candidates for matching with the input image. In case the SIC is small, dense matching is applied to get a matching score for each of the training images in the SIC. However, when the SIC is big, sparse matching is applied to the training images in the SIC, followed by dense matching for sparse matches. In an embodiment of the present invention, the SICs are created by the data storage based on identifiers associated with the objects.

In an embodiment of the present invention, the matching system 500/facial recognition pipeline is configured to handle scenarios where the input image is of low resolution, occlusion, glare, color changes, rotation, skews, facial masking (sunglasses, hats, wigs, etc.) and many other transformations. In an embodiment of the present invention, the facial recognition application may vary based on the usage or the requirement of the users. For example, the user may be seeking sports venue admission, requiring less heightened facial recognition than flight boarding or payment transaction, and hence, removing at least portions of the iterative matching technique.

Figure 7:
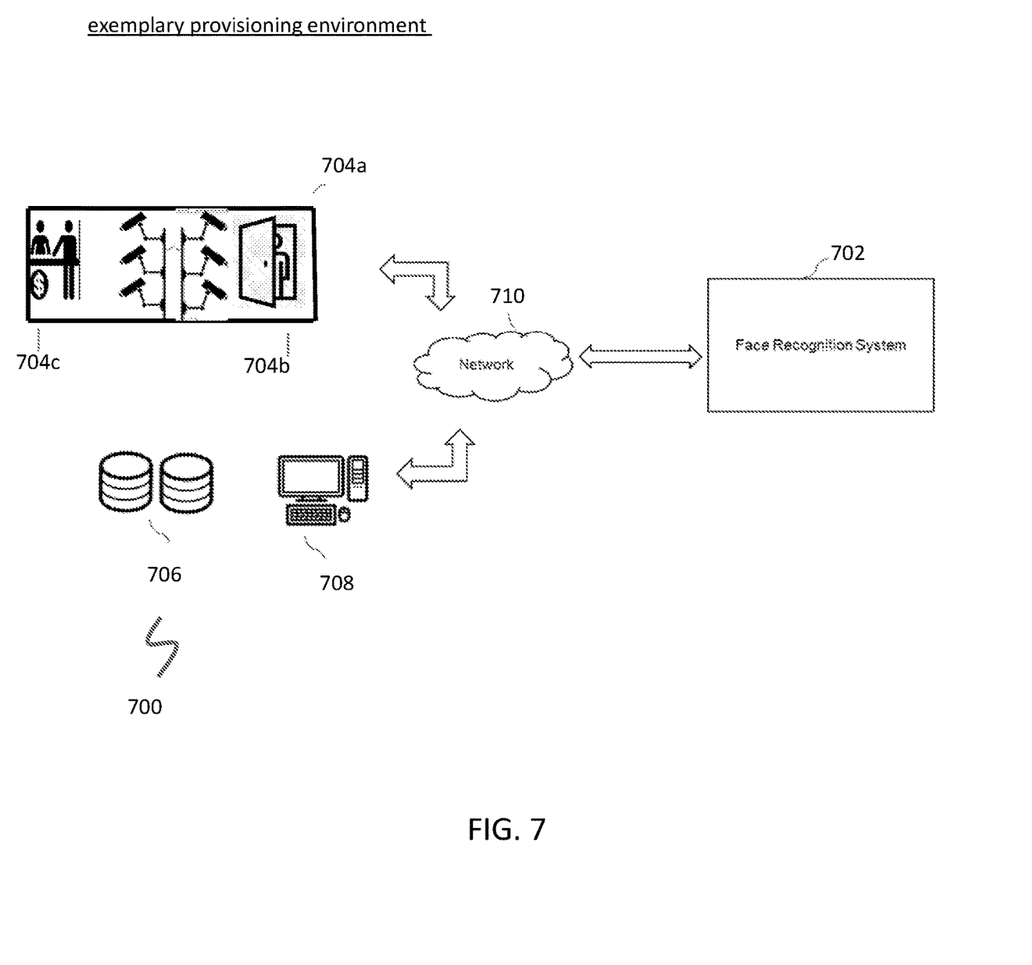
FIG. 7 is a network diagram of the broader Point-of-Recognition (POR) provisioning featuring the facial recognition pipeline, including the end-user image capture means and provisioning means, in accordance with an aspect of the invention.

FIG. 7 represents an exemplary network diagram of the facial recognition pipeline coupled to an end-user provisioning system. As shown, FIG. 7 illustrates an exemplary environment 700 in which various embodiments of the present invention can be practiced. The environment 700 includes a Face Recognition System 702, a facial capture means/real-time streaming system 704a, a gate-keeping Point-of-Recognition (POR) site 704b, a payment POR 704c, video/image archive 706, and a computer system 708. The real-time streaming system 704a includes a video server, and a plurality of video/image capturing devices installed at the POR. Examples of the locations include, but are not limited to, roads, parking spaces, garages, toll booths, outside residential areas, outside office spaces, outside public places (such as malls, recreational areas, museums, libraries, hospitals, police stations, fire stations, schools, colleges). Examples of payment POR may be in stores, pop-up stores, markets, transit, restaurants, and the like. Examples of gate-keeping POR may be a boarding gate, transit entrance, restaurant entrance, arena entrance, shopping mall entrance, etc. The video/image capturing devices include, but are not limited to, Closed-Circuit Television (CCTVs) cameras, High Definition (HD) cameras, non-HD cameras, handheld cameras, mobile devices, or any other video/image grabbing units. The video server of the real-time streaming system 704 receives a dynamic imagery or video footage from the video/image capturing devices and transmits the associated data to the face recognition system/pipeline 702. The video/image archive 706 is a data storage that is configured to store pre-recorded or archived videos/images. The video/image archive 706 may be composed of a plurality of local databases or remote databases. Also, the databases may be centralized and/or distributed. In an alternate scenario, the video/image archive 706 may store data using a cloud-based scheme. Similar to the real-time streaming system 704, the video/image archive 706 transmits data to the face recognition system 702. The computer system 708 is any computing device remotely located from the face recognition 702, and stores a plurality of videos/images in its local memory. In an embodiment, the computer system 708 can be replaced by one or more of a computing server, a mobile device, a memory unit, and a handheld device. The real-time streaming system 704, the video/image archive 706, the computer system 708 and the face recognition system 702 are connected over a network 710. In an embodiment of the present invention, the real-time streaming system 704 and/or the computer system 708 may also send data (images/frames of a video) to the video/image archive 706 for storage and subsequent retrieval.

The face recognition system 702 is part of at least one of a surveillance system, a security system, a traffic monitoring system, a home security system, an access control system, toll fee system—in addition to a POR system. The face recognition system 702 is configured to receive data from the real-time streaming system 704, the video/image archive 706, and/or the computing system 708. The data can be in form of one or more video streams and/or one or more images. In case of the one or more video streams, the face recognition system 702 converts each video into a sequence of frames. Broadly, the face recognition system 702 processes the one or more received images (or frames of videos) and executes a face recognition technique. Face recognition involves receiving an image/frame, detecting one or more faces in the image, detecting feature points for each of the detected faces in the image, aligning and normalizing the detected feature points, extracting feature descriptors based on the detected feature points and matching the extracted feature descriptor with at least one of a pre-stored facial image, comprising at least a first and second round of matching, wherein the second round of matching only selects the facial images that matched above a pre-defined threshold from the first round of matching wherein the access control point further comprises at least one of the following provisioning: allow access to a venue/event, deny access to a venue/event, or process a purchasing transaction.

In some embodiments, the method flowchart may be implemented in any suitable hardware, software, firmware, or combination thereof, that exists in the related art or that is later developed. In the drawings and specification, there have been disclosed exemplary embodiments of the disclosure. Although specific terms are employed, they are used in a generic and descriptive sense only and not for purposes of limitation, the scope of the invention being defined by the following claims. Those skilled in the art will recognize that the present invention admits of a number of modifications, within the spirit and scope of the inventive concepts, and that it may be applied in numerous applications, only some of which have been described herein. It is intended by the following claims to claim all such modifications and variations which fall within the true scope of the invention.

Embodiments described in the present disclosure can be implemented by any system having a processor and a non-transitory storage element coupled to the processor, with encoded instructions stored in the non-transitory storage element. The encoded instructions when implemented by the processor configure the system to extract features of the image as discussed above in FIGS. 1-7. The systems can practice all or part of the recited method, can be a part of the recited systems, and/or can operate according to instructions in the non-transitory storage element. The non-transitory storage element can be accessed by a general purpose or special purpose computer, including the functional design of any special purpose processor. Few examples of such non-transitory storage element can include RAM, ROM, EEPROM, CD-ROM or other optical disk storage or other magnetic. The processor and non-transitory storage element (or memory) are known in the art, thus, any additional functional or structural details are not required for the purpose of the current disclosure.

We claim:

1. A facial recognition method, said method comprising the steps of:
    extracting a feature descriptor from a detected feature point of a detected face in an input image frame from a video/image capturing device; and
    matching the extracted feature descriptor with at least one of a pre-stored facial image that is index-mapped using a constrained deformable part-based model (CDPBM) that uses Histogram-of-Gradient (HoG) as part-based filters and trained by latent Support Vector Machine (SVM) to determine face feature point location and geometry, comprising at least a first and second round of matching, wherein the second round of matching only selects the index-mapped facial images that matched above a pre-defined threshold from the first round of matching.

2. The method of claim 1, wherein the index mapping generating an index map, is in at least one of an array, hash table, lookup table, or a k-dimensional (k-d) tree format in order to speed up identifying a matching image among the pre-stored images for the input image for facial recognition.

3. The method of claim 2, further comprising the step of pruning the k-dimensional (k-d) tree.

4. The method of claim 1, further comprising the step of comparing a signature of the input image with the one or more feature descriptors of the pre-stored image using at least one of spatial consistency or a temporal verification check on the matching image.

5. The method of claim 1, further comprising the step of computing a matching score between the input image and the pre-stored image.

6. The method of claim 1, further comprising the step of clustering a set of training images into Similar Image Clusters (SICs).

7. The method of claim 1, further comprising the step of receiving the input image frame from at least one of an access control point or surveillance point, wherein the access control point or surveillance point further comprises at least one of the following provisioning: allow access to a venue/event; deny access to a venue/event; process a purchasing transaction; or provide admission to a mass transit.

8. A facial recognition system comprising:
    an image input unit;
    a feature extraction unit;
    an index mapping unit;
    a matching unit;
    a processor, a non-transitory storage element coupled to the processor, encoded instructions stored in the non-transitory storage element, wherein the encoded instructions when implemented by the processor, configure the system to:
    receive a video and/or image from a surveillance or access-control point for parsing into image frames or segments by the image input unit;
    extract a feature descriptor using a constrained deformable part-based model (CDPM) that uses Histogram of Gradient (HoG) as part-based filters and trained by latent Support Vector Machine (SVM) to determine face feature point location and geometry by the feature extraction unit; and match the extracted feature descriptor with at least one of a pre-stored facial image that is index-mapped, comprising at least a first and second round of matching, wherein the second round of matching only selects the index-mapped facial images that matched above a pre-defined threshold from the first round of matching by the matching unit.

9. The system of claim 8, wherein the image input unit receives input from at least one of a real-time streaming system, video/image archive, computer system, video capture device, remote server, or hand-held device.

10. The system of claim 8, wherein the image input unit or feature extraction unit selects the best appearance of the face across the frames based on at least one of a sharpness, size, noise, motion blur, or pose variation.

11. The system of claim 8, further comprising a face alignment and normalization unit further configured to normalize the detected feature point by at least one of a Gamma Correction, Difference of Gaussian (DoG) filtering, Masking, or Contrast Equalization.

12. The system of claim 11, wherein the masking further comprises detecting an upper and lower edge of glasses and applying a filter to remove masking effects of the glasses on the face.

13. The system of claim 11, wherein the masking further comprises detecting outer edges of facial hair and applying a filter to remove masking effects of the facial hair on the face.

14. The system of claim 8, wherein the feature extraction unit is further configured to transform the feature descriptors to a lower dimensional space.

15. The system of claim 14, wherein the transformation is performed using at least one of a discriminate analysis approach such as Fisher Discriminant Analysis, Principle Component Analysis and Independent Component Analysis (ICA).

16. The system of claim 8, further comprising the step of computing a matching score between the input image and the pre-stored image and determining the threshold based on the surveillance or access control point by the matching unit.

17. The system of claim 8, wherein the access control point further comprises at least one of the following provisioning: allow access to a venue/event, deny access to a venue/event, or process a purchasing transaction.

18. A facial recognition system comprising:

a processor, a non-transitory storage element coupled to the processor, encoded instructions stored in the non-transitory storage element, wherein the encoded instructions when implemented by the processor, configure the system to:

receive a video and/or image from a surveillance or access-control point for parsing into image frames or segments;

extract a feature descriptor from a detected feature point of a detected face in the input image frame or segment; and match the extracted feature descriptor with at least one of a pre-stored facial image using a constrained deformable part-based model (CDPM) that uses Histogram of Gradient (HoG) as part-based filters and trained by latent Support Vector Machine (SVM) to determine face feature point location and geometry, comprising at least a first and second round of matching, wherein the second round of matching only selects the facial images that matched above a pre-defined threshold from the first round of matching wherein the access control point further comprises at least one of the following provisioning: allow access to a venue/event, deny access to a venue/event, or process a purchasing transaction.

\* \* \* \* \*